(12) United States Patent
Kuribayashi (10) Patent No.: US 7,777,775 B2
(45) Date of Patent: Aug. 17, 2010

(54) OPTICAL BEAM SCANNING APPARATUS, IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1062 days.

(21) Appl. No.: 11/489,781

(22) Filed: Jul. 20, 2006

(65) Prior Publication Data

US 2008/0018955 A1 Jan. 24, 2008

(51) Int. Cl.
*B41J 15/14* (2006.01)
*B41J 27/00* (2006.01)

(52) U.S. Cl. ..................... 347/242; 347/257
(58) Field of Classification Search ............ 347/238, 347/241–245, 256–258, 263
See application file for complete search history.

(56) References Cited

U.S. PATENT DOCUMENTS 4,763,334 A * 8/1988 Shimada et al. ........ 372/29.014
6,798,820 B2 * 9/2004 Okuwaki et al. ............ 372/107

FOREIGN PATENT DOCUMENTS

| JP | 2000-269581 | 9/2000 |
|----|-------------|--------|
| JP | 2002-182145 | 6/2002 |
| JP | 2003-098461 | 4/2003 |
| JP | 2003-161904 | 6/2003 |

* cited by examiner

*Primary Examiner*—Hai C Pham
(74) *Attorney, Agent, or Firm*—Turocy & Watson, LLP (57) ABSTRACT

In an optical beam scanning apparatus and an image forming apparatus equipped with the optical beam scanning apparatus of the present invention, a holder base is screwed to an optical housing, a holder holds a light source, and a laser drive board is screwed to the holder. Rotary adjustment of the holder about the optical axis of the light source is performed with respect to the holder base, and the holder is fixed to the holder base. According to the optical beam scanning apparatus and the image forming apparatus equipped with the optical beam scanning apparatus of the present invention, it is possible to perform rotary adjustment of the light source about the optical axis with ease even in a small space.

20 Claims, 6 Drawing Sheets

OPTICAL BEAM SCANNING APPARATUS, IMAGE FORMING APPARATUS

BACKGROUND OF THE INVENTION

1. Technical Field of the Invention

The present invention relates to an optical beam scanning apparatus and an image forming apparatus equipped with the optical beam scanning apparatus, and more particularly, to an optical beam scanning apparatus configured to be capable of performing rotary adjustment of the light source about the optical axis and an image forming apparatus equipped with the optical beam scanning apparatus.

2. Related Art

An image forming apparatus of the electrophotographic method, such as a laser printer, a digital copying machine, and a laser facsimile machine, is equipped with an optical beam scanning apparatus that forms an electrostatic latent image on the photoconductive drum by irradiating a laser beam (optical beam) on the surface of the photoconductive drum and scanning the laser beam thereon.

Recently, in order to increase the scanning rate on the surface of the photoconductive drum, there has been proposed a method (multi-beam method) for increasing the number of laser beams scanned at a time by providing plural light sources (laser diodes) to a single laser unit. According to the multi-beam method, plural beams for respective color components (for example, yellow, magenta, cyan, and black) emitted from the corresponding light sources undergo processing in the pre-deflection optical systems, while they are combined into a single beam to go incident on the polygon mirror. The beam deflected on the polygon mirror passes through the fθ lens forming the post-deflection optical system, after which it is separated into beams of the respective color components that are irradiated onto the photoconductive drums of the respective color components.

Incidentally, it is necessary for an optical beam scanning apparatus and an image forming apparatus using plural light sources (laser diodes) to perform rotary adjustment of the light sources (laser diodes) about the optical axis to maintain a specific sub-scanning beam pitch on the photoconductive drums. To be more specific, for example, in the case of 600 dpi (Dot Per Inch), it is necessary to perform rotary adjustment of the light source (laser diode) about the optical axis to maintain 42 μm as the sub-scanning beam pitch, and for example, in the case of 1200 dpi, it is necessary to perform rotary adjustment of the light source (laser diode) about the optical axis to maintain 21 μm as the sub-scanning beam pitch. Further, it is also necessary for the light source (laser diode) to match the optical axes with the collimator lens.

Such being the case, there have been proposed various techniques for the rotary adjustment about the optical axis and the optical axis matching with the collimator lens for an optical beam scanning apparatus and an image forming apparatus.

According to the technique proposed in JP-A-2003-161904, when an optical housing provided with laser beam sources, deflection means, and an image forming optical system is attached along guiding means, the position of the optical housing in the scanning direction is determined by scanning direction positioning means, while the position of the optical housing in the optical axis direction is determined by pressing the optical housing against optical axis direction positioning means. This configuration makes it possible to perform assembly and adjustment works of the optical housing with respect to the image forming apparatus precisely with ease.

Also, according to the technique proposed in JP-A-2003-98461, a lens holder holding a cylindrical cell enclosing a lens made of resin is layered on a lens holder holding a cell enclosing respective lenses made of glass, while each lens holder is set to be able to adjust the position in the optical axis direction. While an adjustment is being made, movements of a lever that oscillates with rotations of the screw are scaled down and transmitted to the holders via a linking shaft. This configuration makes it possible to adjust and hold the cylindrical cell within a long groove in a perpendicular portion of the holder by a hold cam in a direction perpendicular to the optical axis and in the direction of rotation about the optical axis.

Further, according to the technique proposed in JP-A-2004-246032, a first optical system comprises a cylinder lens and a lens holding member holding the cylinder lens, and the lens holding member is attached to the housing of the optical beam scanning apparatus to be able to move along the optical axis direction. This configuration makes it possible to hold the lens and adjust the position thereof in the optical axis direction using a simple structure.

Generally, by taking a tolerance of components into account, it is preferable to perform rotary adjustment about the optical axis in the optical beam scanning apparatus and the image forming apparatus in a state where all the unit components of the optical beam scanning apparatus and the image forming apparatus have been assembled.

However, when the rotary adjustment about the optical axis is performed in an assembled state, the rotary adjustment about the optical axis is normally performed by making access to the light source (laser diode) from behind because of supporting and screwing for the rotary adjustment. This requires a space to allow access to the light source (laser diode) from behind for performing adjustment, and therefore poses a problem that the units of the optical beam scanning apparatus and the image forming apparatus are increased in size.

Figure 1:
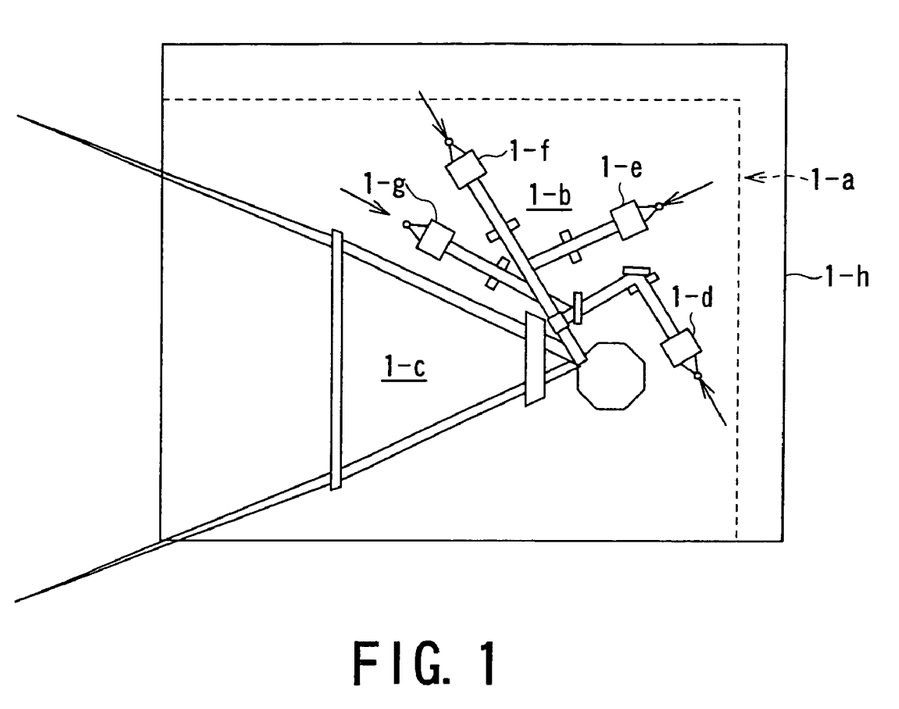
FIG. 1 is an explanatory view used to describe a manner in which a unit in an optical beam scanning apparatus and an image forming apparatus in the related art is increased in size.

To be more concrete, as is shown in FIG. 1, roughly speaking, a pre-deflection optical system 1-*b* and a post-deflection optical system 1-*c* are provided within a unit 1-*a* of the optical beam scanning apparatus. Laser units 1-*d* through 1-*g*, for example, of respective colors are disposed in the pre-deflection optical system 1-*b*. However, when rotary adjustment about the optical axis is performed by making access to the light sources (laser diodes 1-*d* through 1-*g*) from behind, a space to allow access in the directions indicated by arrows for performing adjustment is necessary. The unit 1-*a* of the optical beam scanning apparatus therefore has to be increased as large as the unit 1-*h*.

As a countermeasure, a hole may be provided in the unit of the optical beam scanning apparatus, so that access is made to the light sources (laser diodes) from the outside of the unit. This countermeasure, however, requires a die of the sliding structure for the unit, which deteriorates the accuracy or increases the cost.

These problems cannot be solved by the techniques proposed in JP-A-2003-161904, JP-A-2003-98461, and JP-A-2004-246032.

SUMMARY OF THE INVENTION

The present invention was devised in view of the foregoing, and therefore has an object to provide an optical beam scanning apparatus capable of performing rotary adjustment of the light source about the optical axis with ease even in a small space and an image forming apparatus equipped with the optical beam scanning apparatus.

In order to solve the problems discussed above, an optical beam scanning apparatus according to one aspect of the present invention is an optical beam scanning apparatus using plural light sources, including: a holder base screwed to an optical housing of the optical beam scanning apparatus; a holder attached to the holder base and configured to hold a corresponding light source; a laser drive board screwed to the holder; a rotary adjustment mechanism configured to perform rotary adjustment of the holder about an optical axis of the light source with respect to the holder base; and a fixing mechanism configured to fix the holder to the holder base.

In order to solve the problems discussed above, an image forming apparatus according to another aspect of the present invention is an image forming apparatus equipped with an optical beam scanning apparatus using plural light sources, wherein the optical beam scanning apparatus includes: a holder base screwed to an optical housing of the optical beam scanning apparatus; a holder attached to the holder base and configured to hold a corresponding light source; a laser drive board screwed to the holder; a rotary adjustment mechanism configured to perform rotary adjustment of the holder about an optical axis of the light source with respect to the holder base; and a fixing mechanism configured to fix the holder to the holder base.

Regarding the optical beam scanning apparatus according to the firstly mentioned aspect of the present invention, in the optical beam scanning apparatus using plural light sources, the holder base is screwed to the optical housing of the optical beam scanning apparatus, the holder is attached to the holder base and holds the corresponding light source, the laser drive board is screwed to the holder, rotary adjustment of the holder about the optical axis of the light source is performed with respect to the holder base, and the holder is fixed to the holder base.

Regarding the image forming apparatus according to the secondly mentioned aspect of the present invention, that is, the image forming apparatus equipped with the optical beam scanning apparatus using plural light sources, in the optical beam scanning apparatus, the holder base is screwed to the optical housing of the optical beam scanning apparatus, the holder is attached to the holder base and holds the corresponding light source, the laser drive board is screwed to the holder, rotary adjustment of the holder about the optical axis of the light source is performed with respect to the holder base, and the holder is fixed to the holder base.

DETAILED DESCRIPTION OF PREFERRED EMBODIMENTS

Hereinafter, embodiments of the present invention will be described with reference to the drawings.

Figure 2:
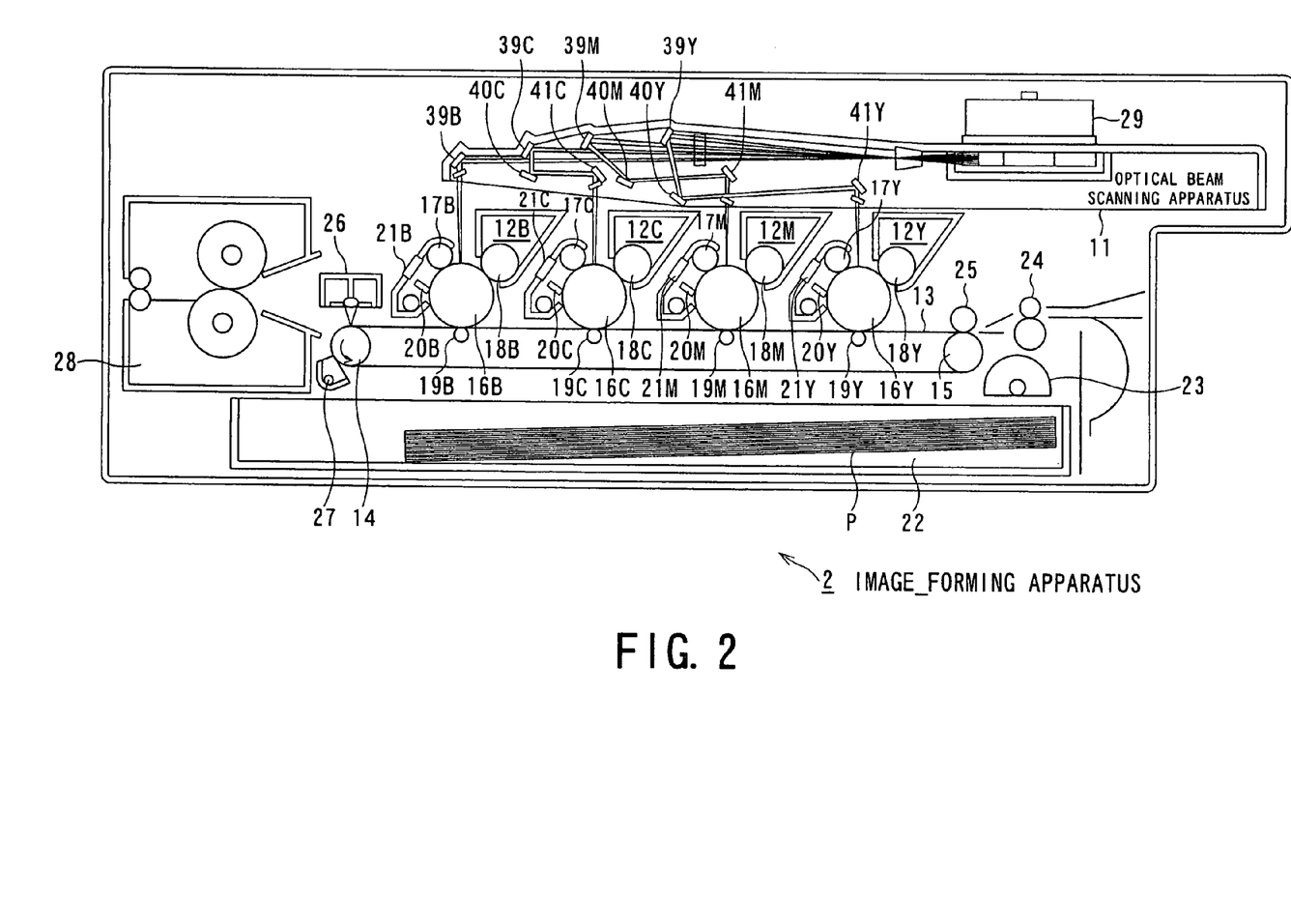
FIG. 2 is a view showing the configuration of an image forming apparatus incorporating an optical beam scanning apparatus to which the present invention is applied.

FIG. 2 shows the configuration of an image forming apparatus 2 incorporating an optical beam scanning apparatus 11 to which the present invention is applied. Because the image forming apparatus 2 normally uses four kinds of image data separated in colors for respective color components including Y (yellow), M (magenta), C (cyan), and B (black) and four sets of various devices used to form images of the respective color components corresponding to Y, M, C, and B, the image data for the respective color components and the corresponding devices are identified by appending capitals Y, M, C, and B as a suffix.

As is shown in FIG. 2, the image forming apparatus 2 includes first through fourth image forming portions 12Y, 12M, 12C, and 12B that form images of respective color components separated in colors.

The image forming portions 12 (12Y, 12M, 12C, and 12B) are disposed below the optical beam scanning apparatus 11 at the corresponding positions to which laser beams L (LY, LM, LC, and LB) of the respective color components are irradiated by a first post-deflection bending mirror 39B and third post-deflection bending mirrors 41Y, 41M, and 41C in the optical beam scanning apparatus 11 in order of the image forming portions 12Y, 12M, 12C, and 12B.

A carrying belt 13 that carries a recording sheet of paper P, onto which images formed individually by the image forming portions 12 (12Y, 12M, 12C, and 12B) are transferred, is disposed below the image forming portions 12 (12Y, 12M, 12C, and 12B).

The carrying belt 13 is pulled across a belt driving roller 14 rotated in the direction indicated by an arrow by an unillustrated motor and a tension roller 15, and is therefore rotated at a specific velocity in the direction in which the belt driving roller 14 is rotated.

The image forming portions 12 (12Y, 12M, 12C, and 12B) are formed in a cylindrical shape to be able to rotate in the direction indicated by the arrow, and respectively include photoconductive drums 16Y, 16M, 16C, and 16B on which electrostatic latent images corresponding to images exposed by the optical beam scanning apparatus 11 are formed.

On the periphery of the photoconductive drums 16 (16Y, 16M, 16C, and 16B), the following are disposed respectively in order in the direction in which the photoconductive drums 16 (16Y, 16M, 16C, and 16B) are rotated: charging devices 17 (17Y, 17M, 17C, and 17B) that confer specific potential to the surfaces of the photoconductive drums 16 (16Y, 16M, 16C, and 16B), developing devices 18 (18Y, 18M, 18C, and 18B) that develop the electrostatic latent images formed on the surfaces of the photoconductive drums 16 (16Y, 16M, 16C, and 16B) by supplying toners of the corresponding colors, transferring devices 19 (19Y, 19M, 19C, and 19B) that transfer toner images on the photoconductive drums 16 (16Y, 16M, 16C, and 16B) onto a recording medium, that is, a recording sheet of paper P, carried by the carrying belt 13, cleaners 20 (20Y, 20M, 20C, and 20B) that remove residual toner on the photoconductive drums 16 (16Y, 16M, 16C, and 16B), and static erasers 21 (21Y, 21M, 21C, and 21B) that remove residual potential remaining on the photoconductive drums 16 (16Y, 16M, 16C, and 16B) after the toner images are transferred.

The transferring devices 19 (19Y, 19M, 19C, and 19B) respectively oppose the photoconductive drums 16 (16Y, 16M, 16C, and 16B) from the back surface of the carrying belt 13 while the carrying belt 13 is present between the photoconductive drums 16 (16Y, 16M, 16C, and 16B) and the selves.

A paper cassette 22 accommodating recording sheets of paper P, on which images formed by the image forming portions 12 (12Y, 12M, 12C, and 12B) are transferred, is disposed below the carrying belt 13. Also, the cleaners 20 (20Y, 20M, 20C, and 20B) remove residual toner, respectively, on the photoconductive drums 16 (16Y, 16M, 16C, and 16B) that was not transferred when the toner images were transferred onto a recording sheet of paper P, respectively, by the transferring devices 19 (19Y, 19M, 19C, and 19B).

A feeding roller 23 that is formed almost in a semicircular shape and feeds recording sheets of paper P accommodated in the paper cassette 22 one by one from the top, on the side in close proximity to the tension roller 15 is disposed at one end of cassette 22.

Between the feeding roller 23 and the tension roller 15, a registration roller 24 that matches the top end of a single recording sheet of paper P taken out from the cassette 22 with the top end of the toner image formed on the photoconductive drum 16B in the image forming portion 12B (black) is disposed.

At the position in close proximity to the tension roller 15 between the registration roller 24 and the first image forming portion 12Y and substantially opposing the position on the outer periphery of the carrying belt 13 corresponding to the position at which the tension roller 15 and the carrying belt 13 come in contact with each other, an attraction roller 25 that confers a specific electrostatic attraction force to a single recording sheet of paper P carried at specific timing by the registration roller 24 is disposed.

In close proximity to one end of the carrying belt 13 and the belt driving roller 14 and substantially on the outer periphery of the carrying belt 13 that comes into contact with the belt driving roller 14, a first registration sensor 26a and a second registration sensor 26b that detect the position of an image formed on the carrying belt 13 or an image transferred onto a recording sheet of paper P are disposed spaced apart by a certain distance in the axial direction of the belt driving roller 14 (because FIG. 2 is a sectional front view, the first registration sensor 26a positioned ahead of the sheet surface is not shown).

At the position on the outer periphery of the carrying belt 13 that comes into contact with the belt driving roller 14 where a recording sheet of paper P carried by the carrying belt 13 will not come into contact, a carrying belt cleaner 27 that removes toner or paper dust from a recording sheet of paper P adhering on the carrying belt 13 is disposed.

In a direction in which a recording sheet of paper P carried by the carrying belt 13 is separated from the belt driving roller 14 and carried further, a fixing device 28 that fixes the toner image, which has been transferred onto the recording sheet of paper P, on the recording sheet of paper P is disposed.

Figure 3:
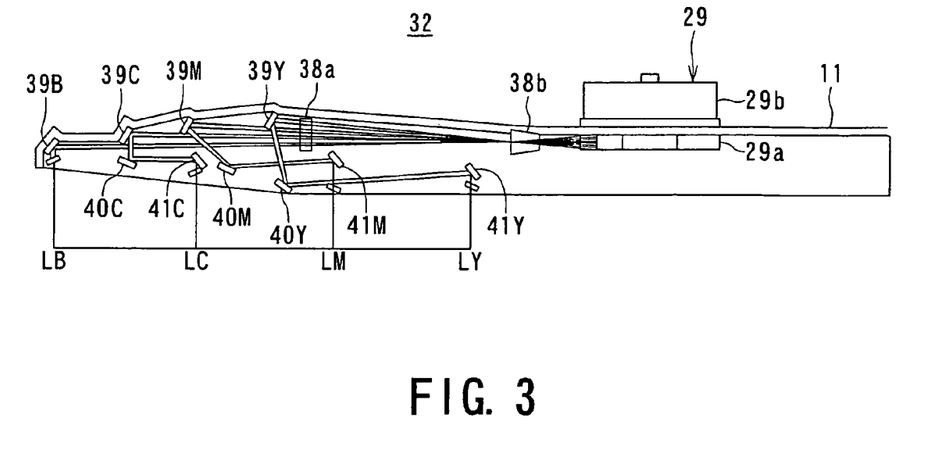
FIG. 3 is a view showing the detailed configuration of the optical beam scanning apparatus of FIG. 2.
Figure 4:
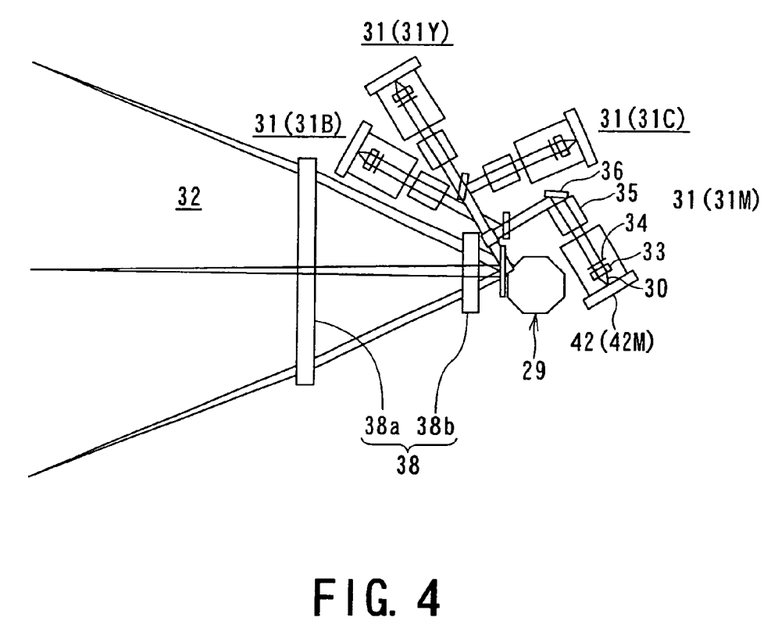
FIG. 4 is another view showing the detailed configuration of the optical beam scanning apparatus of FIG. 2.

FIG. 3 and FIG. 4 show the configuration of the optical beam scanning apparatus 11 of FIG. 2 in detail.

The optical beam scanning apparatus 11 includes an optical deflector 29 comprising a polygonal mirror main body (so-called polygon mirror) 29a having, for example, eight plane reflecting surfaces (plane reflecting mirrors) disposed to form a regular polygon and a motor 29b that rotates the polygonal mirror main body 29a in the main scanning direction at a specific velocity, and light sources 30 (30Y, 30M, 30C, and 30B) that output optical beams, respectively, toward the first through fourth image forming portions 12Y, 12M, 12C, and 12B of FIG. 2.

The optical deflector 29 is deflection means for deflecting optical beams (laser beams) emitted from the light sources 30 (30Y, 30M, 30C, and 30B) toward the image planes disposed at the specific positions, that is, toward the outer peripheral surfaces of the photoconductive drums 16Y, 16M, 16C, and 16B in the first through fourth image forming portions 12Y, 12M, 12C, and 12B, respectively, at a specific linear velocity. In addition, pre-deflection optical systems 31 (31Y, 31M, 31C, and 31B) are disposed between the optical deflector 29 and the light sources 30 (30Y, 30M, 30C, and 30B), and a post-deflection optical system 32 is disposed between the optical deflector 29 and the image planes.

A direction in which the respective laser beams are deflected (scanned) by the optical deflector 29 is referred to as "main scanning direction", and a direction orthogonal to both the main scanning direction and the axial line used as the reference of deflection operations provided to the laser beams by the optical deflector 29 for the laser beams scanned (deflected) by the optical deflector 29 to travel in the main scanning direction is referred to as "sub-scanning direction".

As is shown in FIG. 4, the pre-deflection optical systems 31 respectively include light sources 30 (30Y, 30M, 30C, and 30B) comprising laser diodes and provided for respective color components, finite focusing lenses 33 (33Y, 33M, 33C, and 33B) that confer a specific focusing property to laser beams emitted from the light sources 30 (30Y, 30M, 30C, and 30B), apertures 34 (34Y, 34M, 34C, and 34B) that confer an arbitrary sectional beam shape to laser beams L having passed through the finite focusing lenses 33 (33Y, 33M, 33C, and 33B), and cylinder lenses 35 (35Y, 35M, 35C, and 35B) that further confer a specific focusing property in the sub-scanning direction to the laser beams L having passed through the apertures 34 (34Y, 34M, 34C, and 34B). They trim the sectional beam shape of laser beams emitted from the respective light sources 30 (30Y, 30M, 30C, and 30B) into a specific shape and then guide the beams to the reflection surface of the optical deflector 29.

For a laser beam LC for cyan exiting from the cylinder lens 35C, the optical path is bent by a bending mirror 36C, after which it is guided to the reflection surface of the optical deflector 29 by traveling straight through an optical path combining optical component 37. For a laser beam LB for black exiting from the cylinder lens 35B, the optical path is bent by a bending mirror 36B, after which it is guided to the reflection surface of the optical deflector 29 by being reflected on the optical path combining optical component 37. A laser beam LY for yellow exiting from the cylinder lens 35Y passes by above the bending mirror 36C, after which it is guided to the reflection surface of the optical deflector 29 by traveling straight through the optical path combining optical component 37. For a laser beam LM for magenta exiting from the cylinder lens 35M, the optical path is bent by a bending mirror 36M for the laser beam LM to pass by above the bending mirror 36B, after which it is guided to the reflection surface of the optical deflector 29 by being reflected on the optical path combining optical component 37.

The post-deflection optical system 32 includes an fθ lens 38 (fθ lenses 38a and 38b) comprising a set of two lenses and used to optimize the shapes and the positions on the image planes of the laser beams L (Y, M, C, and B) deflected (scanned) by the polygonal mirror main body 29a, a horizontal synchronization detection photo-detector (not shown) that detects the respective laser beams L to match the horizontal synchronizations of the laser beams L (LY, LM, LC, and LB) having passed through the fθ lens 38 (fθ lenses 38a and 38b), a horizontal synchronization bending mirror (not shown) that bends the respective laser beams L toward the horizontal synchronization detection photo-detector, an optical path correction element (not shown) disposed between the horizontal synchronization bending mirror and the horizontal synchronization detection photo-detector to bring the laser beams L (LY, LM, LC, and LB) of the respective color components reflected on the horizontal synchronization bending mirror toward the horizontal synchronization detection photo-detector almost into agreement with the position of incidence on the detection surface of the horizontal synchronization detection photo-detector, and plural post-deflection bending mirrors 39Y, 40Y, and 41Y (yellow); 39M, 40M, and 41M (magenta); 39C, 40C, and 41C (cyan); and 39B (black) that guide the laser beams L (LY, LM, LC, and LB) of the respective color components exiting from the fθ lens 38 (fθ lenses 38a and 38b) to the corresponding photoconductive drums 16 (16Y, 16M, 16C, and 16B).

In addition, as is shown in FIG. 4, the optical beam scanning apparatus 11 is provided with holding mechanisms 42 (42Y, 42M, 42C, and 42B) that respectively hold the light sources 30 (30Y, 30M, 30C, and 30B).

FIGS. 5A and 5B show the detailed configuration of the holding mechanism 42 to hold the light source 30. FIG. 5A is a plan view of the holding mechanism 42 and FIG. 5B is a front view of the holding mechanism 42 taken on the line A-A' of FIG. 5A when viewed in the X direction.

As are shown in FIGS. 5A and 5B, the holding mechanism 42 comprises a holder base 43 screwed to the unillustrated optical housing of the optical beam scanning apparatus 11, a holder 44 with arm that is attached to the holder base 43 and holds the corresponding light source 30 (30Y, 30M, 30C, and 30B), and a laser drive board 45 screwed to the holder 44 with arm in the X direction.

Figure 6:
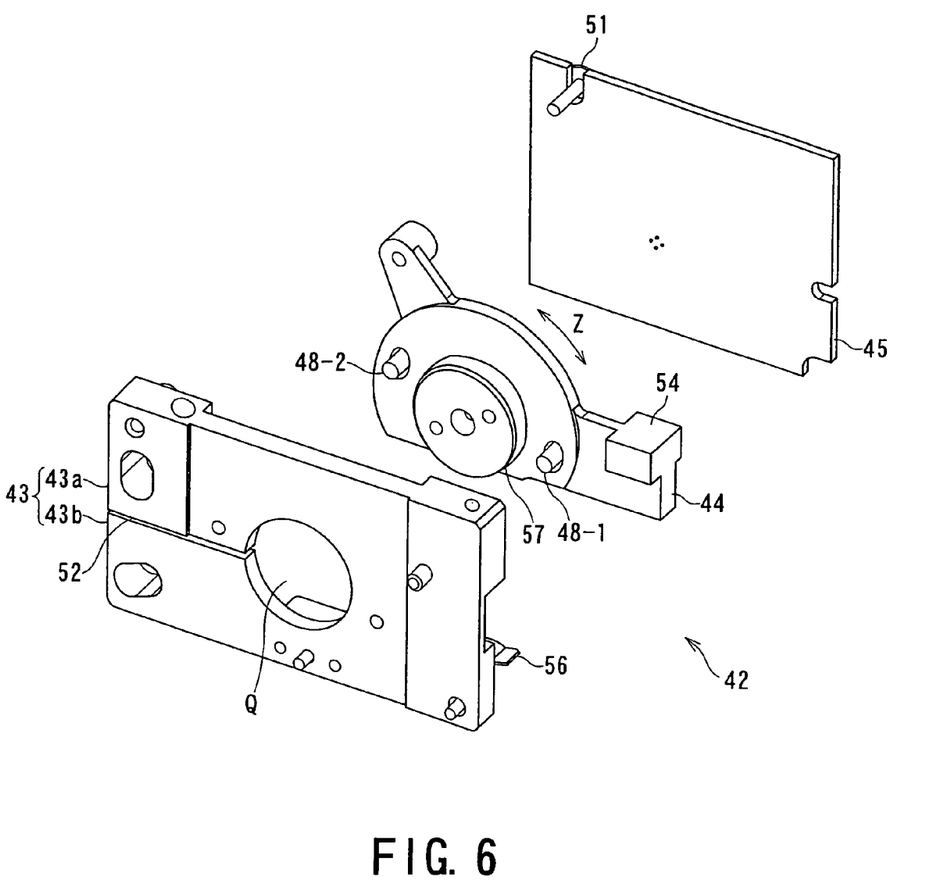
FIG. 6 is an exploded view of the holding mechanism of FIG. 5 when viewed in the Y direction.

The holder base 43 is screwed to the unillustrated optical housing of the optical beam scanning apparatus 11 with a holder base fixing screw 46, and as is shown in FIG. 6 (an exploded view of the holding mechanism 42 in the Y direction), it has an attachment hole Q for a cylinder portion 57 of the holder 44 with arm to be fit therein.

Each corresponding light source 30 (30Y, 30M, 30C, and 30B) is fixed to the holder 44 with arm by light source fixing screws 47-1 and 47-2. A tolerance at the attachment position of the holder 44 with arm and the light source 30 is determined strictly.

As is shown in FIG. 6, the holder 44 with arm has the cylinder portion 57 protruding toward the holder base 43, and it is positioned by fitting the cylinder portion 57 of the holder 44 with arm into the attachment hole Q in the holder base 43. The fitting of the cylinder portion 57 of the holder 44 with arm into the attachment hole Q in the holder base 43 has been previously set to loose fitting to allow the holder 44 with arm to rotate in the Z direction about the center of the rotation of the cylinder portion 57 used as the axis of rotation.

Figure 7:
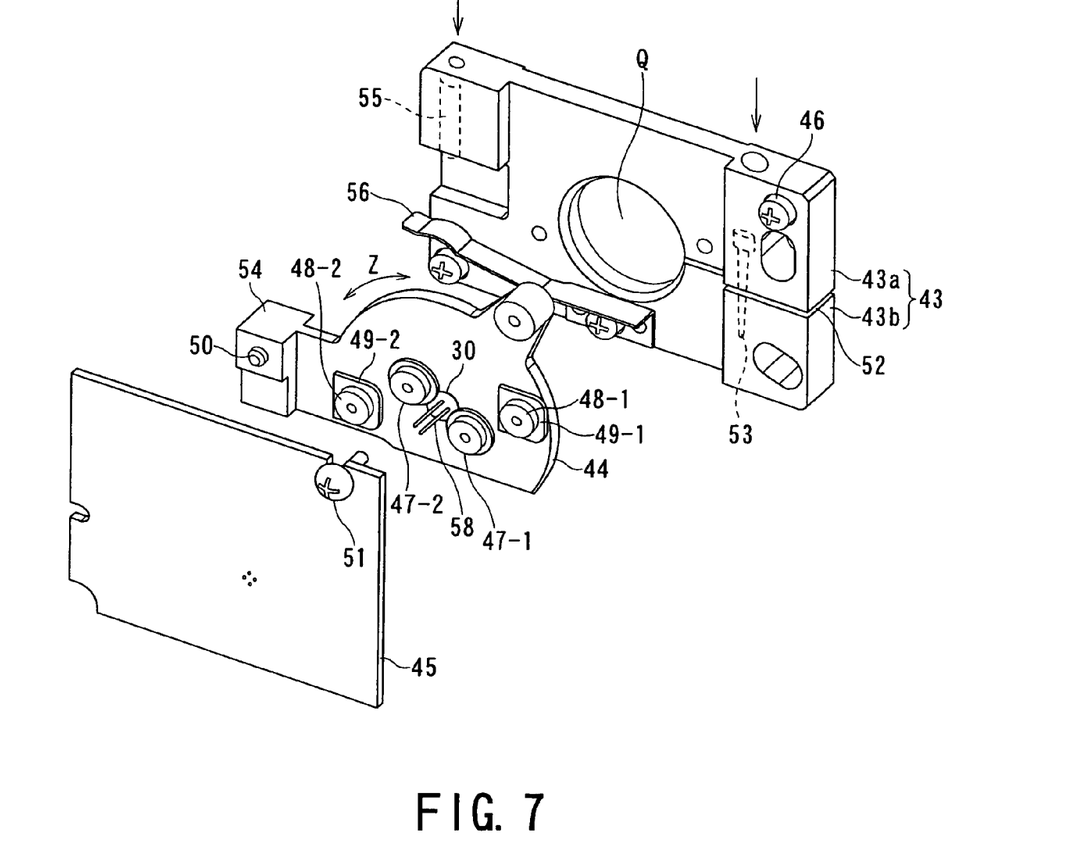
FIG. 7 is an exploded view of the holding mechanism of FIG. 5 when viewed in the X direction.

As is shown in FIG. 6, the holder 44 with arm is attached by being screwed to the holder base 43 with holder fixing screws 48-1 and 48-2, and as is shown in FIG. 7 (an exploded view of the holding mechanism 42 in the X direction), inhibiting leaf springs 49-1 and 49-2 are interposed between the holder fixing screws 48-1 and 48-2 and the holder 44 with arm in order to prevent the occurrence of floating of the holder 44 with arm in the optical axis direction when rotated in the Z direction about the center of rotation of the cylinder portion used as the axis of rotation. A spring load is set to the inhibiting leaf springs 49-1 and 49-2 to allow rotations when the holder 44 with arm is rotated. The holder 44 with arm is provided with a positioning pin 50 used to position the laser drive board 45.

The laser drive board 45 is positioned by the positioning pin 50 provided to the holder 44 with arm, and screwed to the holder 44 with arm by a basis fixing screw 51.

Figure 5:
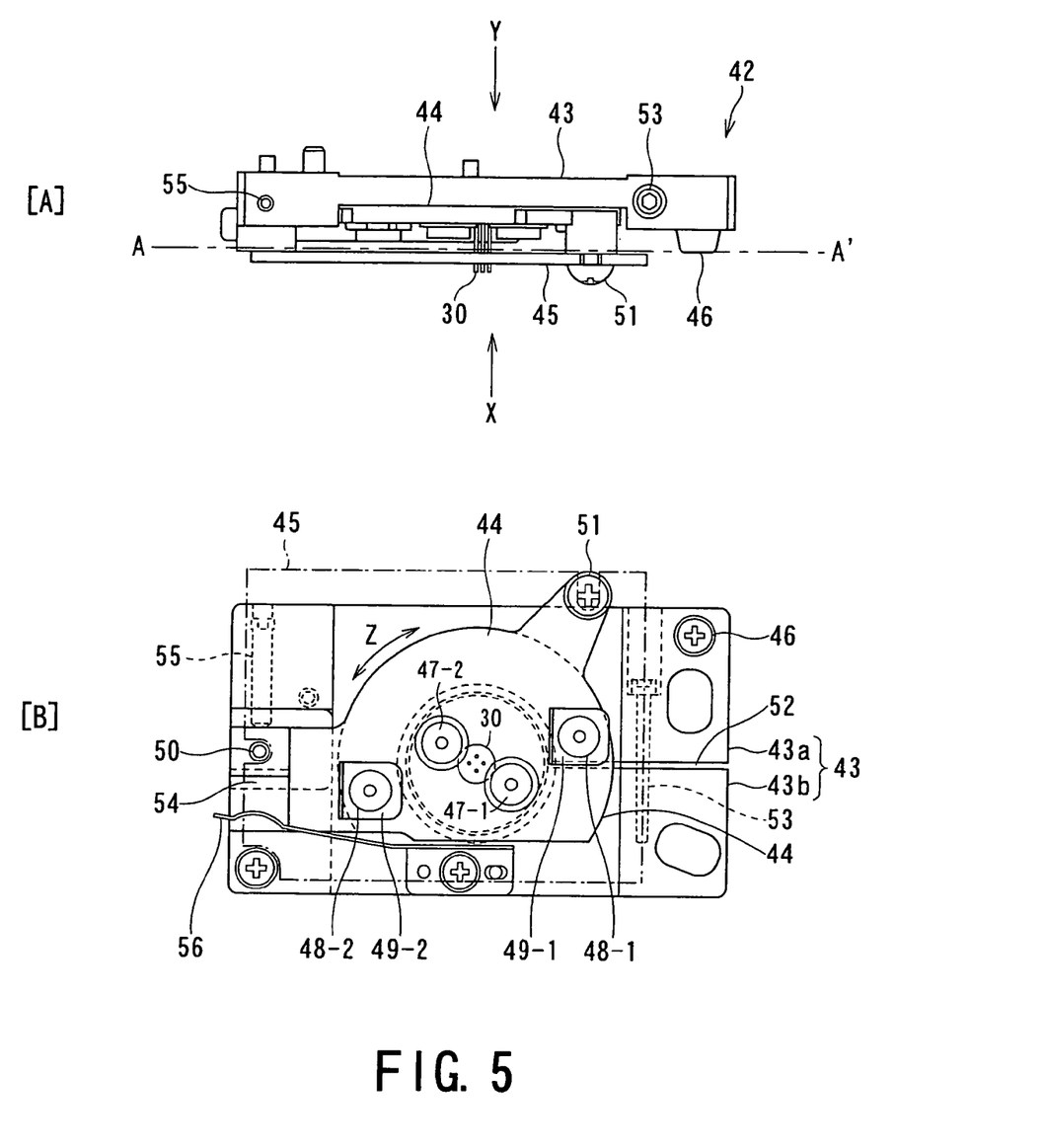
FIG. 5A is a plan view showing the configuration of a holding mechanism in detail.
FIG. 5B is a front view taken on the line A-A' of FIG. 5A.

Incidentally, as is shown in FIG. 5 through FIG. 7, a slit 52 as an expanding slot is provided to the holder base 43 from the attachment hole Q toward the side surface, and a tightening screw 53 is able to tighten holder base elements 43a and 43b mutually that are brought closer and spaced apart by the slit 52. This tightening allows the tightening screw 53 to tighten the cylinder portion 57 of the holder 44 with arm that has been fit into the attachment hole Q in the holder base 43. It is thus possible to fix the holder 44 with arm not to rotate in the Z direction by inhibiting rotations of the holder 44 with arm.

Also, as are shown in FIG. 5 through FIG. 7, the holder 44 with arm is provided with an arm 54 for rotary adjustment. The holder base 43 is provided with a set screw 55 that applies a downward pressure to the arm 54 from the upper portion of the arm 54 when the holder 44 with arm is fit therein, and an adjusting leaf spring 56 that pushes the arm 54 upward from the lower portion.

As is shown in FIG. 7, by accessing the holding mechanism 42 in the direction indicated by an arrow (from the upper portion direction) to rotate the set screw 55 by a specific quantity of rotations to move downward, it is possible to perform counterclockwise rotary adjustment in the Z direction. Meanwhile, by rotating the set screw 55 by a specific quantity of rotations to move upward, it is possible to perform clockwise rotary adjustment in the Z direction. This configuration makes it possible to perform rotary adjustment of the light source about the optical axis with ease to maintain a specific sub-scanning beam pitch on the photoconductive drum 16 by making access to the holding mechanism 42 from the upper portion direction even in a small space. It is thus possible to prevent the units of the optical beam scanning apparatus 11 and the image forming apparatus 2 from increasing in size.

The tip end of the set screw 55 is preferably of a spherical shape by taking the ease of siding on the arm 54 into account, so that rotary adjustment can be performed on the arm 54 at a higher degree of accuracy. Alternatively, for example, a coil spring or a spring plunger may be used instead of the adjusting leaf spring 56.

As is shown in FIG. 7, the laser drive board 45 is fixed to the holder 44 with arm by the positioning pin 50 and the board fixing screw 51 to maintain the positional relation with respect to the holder 44 with arm. In other words, when rotary adjustment of the holder 44 with arm is performed in the Z direction, the laser drive board 45 rotates in association with rotations of the holder 44 with arm. This configuration makes it possible to prevent a connecting terminal 58 of each corresponding light source 30 (30Y, 30M, 30C, and 30B) from being twisted in association with rotations of the holder 44 with arm when rotary adjustment of the holder 44 with arm is performed in the Z direction, which can in turn prevent a load from being applied to the connection terminal 58 of each corresponding light source 30 (30Y, 30M, 30C, and 30B).

What is claimed is:

1. An optical beam scanning apparatus using plural light sources, comprising:
   a holder configured to hold a corresponding light source, having an adjusting arm;
   a holder base screwed to an optical housing of the optical beam scanning apparatus, the holder base having a screw that applies a pressure to an adjusting arm from an upper portion and a first pushing member that pushes up the adjusting arm from a lower portion, and the holder being attached to the holder base;

a laser drive board screwed to the holder;
a rotary adjustment mechanism configured to perform rotary adjustment of the holder about an optical axis of the light source with respect to the holder base, by applying a pressure to the adjusting arm by rotating the screw in a specific direction; and
a fixing mechanism configured to fix the holder to the holder base.

2. The optical beam scanning apparatus according to claim 1, wherein:
the rotary adjustment mechanism adjusts the rotations of the holder in a counterclockwise direction by rotating the screw to move in a downward direction.

3. The optical beam scanning apparatus according to claim 1, wherein:
the rotary adjustment mechanism adjusts the rotations of the holder in a clockwise direction by rotating the screw to move in an upward direction.

4. The optical beam scanning apparatus according to claim 1, wherein:
the first pushing member is a leaf spring, a coil spring, or a spring plunger.

5. The optical beam scanning apparatus according to claim 1, wherein:
the screw is provided on the upper portion of the holder base.

6. The optical beam scanning apparatus according to claim 1, wherein:
the holder base is provided with an attachment hole for a cylinder portion provided to the holder at a specific position to be loosely fit therein, and a slit heading from the attachment hole to a side surface; and
the fixing mechanism fixes the holder loosely fit into the attachment hole by tightening a tightening screw inserted across the slit.

7. The optical beam scanning apparatus according to claim 6, wherein:
the tightening screw is provided to an upper portion of the fixing mechanism.

8. The optical beam scanning apparatus according to claim 1, wherein:
the holder is screwed to the holder base via a pushing member.

9. The optical beam scanning apparatus according to claim 8, wherein:
the pushing member is a leaf spring.

10. An image forming apparatus equipped with an optical beam scanning apparatus using plural light sources, wherein the optical beam scanning apparatus comprises:
a holder configured to hold a corresponding light source, having an adjusting arm;
a holder base screwed to an optical housing of the optical beam scanning apparatus, the holder base having a screw that applies a pressure to an adjusting arm from an upper portion and a first pushing member that pushes up the adjusting arm from a lower portion, and the holder being attached to the holder base;
a laser drive board screwed to the holder;
a rotary adjustment mechanism configured to perform rotary adjustment of the holder about an optical axis of the light source with respect to the holder base, by applying a pressure to the adjusting arm by rotating the screw in a specific direction; and
a fixing mechanism configured to fix the holder to the holder base.

11. The image forming apparatus according to claim 10, wherein:
the rotary adjustment mechanism adjusts the rotations of the holder in a counterclockwise direction by rotating the screw to move in a downward direction.

12. The image forming apparatus according to claim 10, wherein:
the rotary adjustment mechanism adjusts the rotations of the holder in a clockwise direction by rotating the screw to move in an upward direction.

13. The image forming apparatus according to claim 10, wherein:
the first pushing member is a leaf spring, a coil spring, or a spring plunger.

14. The image forming apparatus according to claim 10, wherein:
the screw is provided on the upper portion of the holder base.

15. The image forming apparatus according to claim 10, wherein:
the holder base is provided with an attachment hole for a cylinder portion provided to the holder at a specific position to be loosely fit therein, and a slit heading from the attachment hole to a side surface; and
the fixing mechanism fixes the holder loosely fit into the attachment hole by tightening a tightening screw inserted across the slit.

16. The image forming apparatus according to claim 15, wherein:
the tightening screw is provided to an upper portion of the fixing mechanism.

17. The image forming apparatus according to claim 10, wherein:
the holder is screwed to the holder base via a pushing member.

18. The image forming apparatus according to claim 17, wherein:
the pushing member is a leaf spring.

19. An adjusting method of an optical beam scanning apparatus using plural light sources, comprising the steps of:
preparing the optical beam scanning apparatus including a holder configured to hold a corresponding light source, having an adjusting arm, a holder base screwed to an optical housing of the optical beam scanning apparatus, the holder base having a screw that applies a pressure to an adjusting arm from an upper portion and a first pushing member that pushes up the adjusting arm from a lower portion, and the holder being attached to the holder base, a laser drive board screwed to the holder, a rotary adjustment mechanism configured to perform rotary adjustment of the holder about an optical axis of the light source with respect to the holder base, and a fixing mechanism configured to fix the holder to the holder base; and
adjusting rotations of the holder by the rotary adjustment mechanism, by applying a pressure to the adjusting arm by rotating the screw in a specific direction.

20. An adjusting method of an image forming apparatus having an optical beam scanning apparatus using plural light sources, comprising the steps of:
preparing the optical beam scanning apparatus including a holder configured to hold a corresponding light source, having an adjusting arm, a holder base screwed to an optical housing of the optical beam scanning apparatus, the holder base having a screw that applies a pressure to an adjusting arm from an upper portion and a first pushing member that pushes up the adjusting arm from a lower portion, and the holder being attached to the holder base, a laser drive board screwed to the holder, a rotary adjustment mechanism configured to perform rotary adjustment of the holder about an optical axis of the light source with respect to the holder base, and a fixing mechanism configured to fix the holder to the holder base; and adjusting rotations of the holder by the rotary adjustment mechanism, by applying a pressure to the adjusting arm by rotating the screw in a specific direction.

* * * * *